April 14, 1964 A. BREDE 3,128,801
SAW WITH RECIPROCATING ARBOR ASSEMBLY
Filed Dec. 11, 1961 2 Sheets-Sheet 1
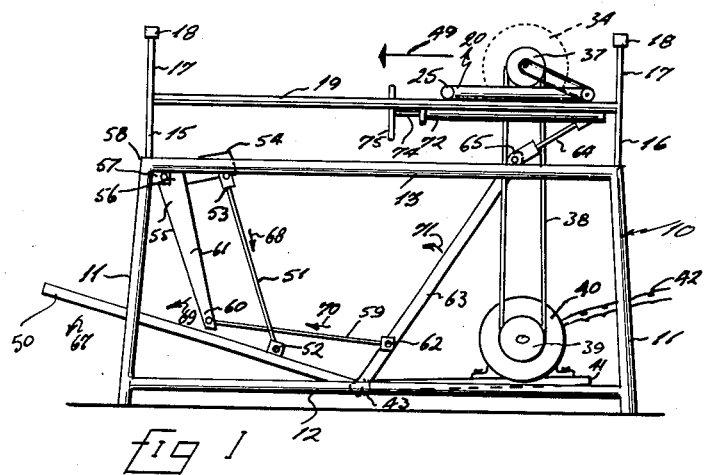
Fig. 1
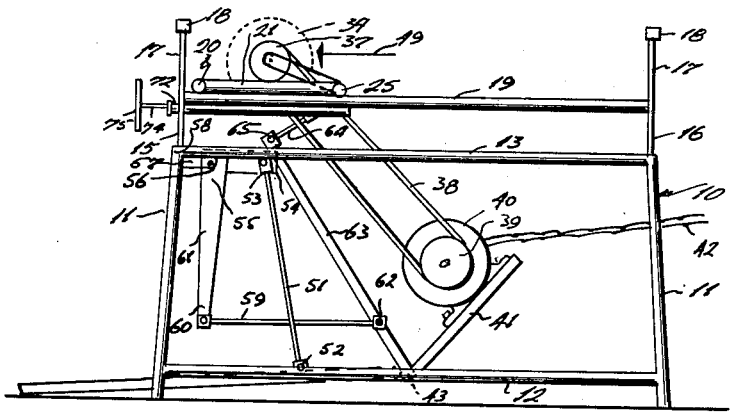
Fig. 2
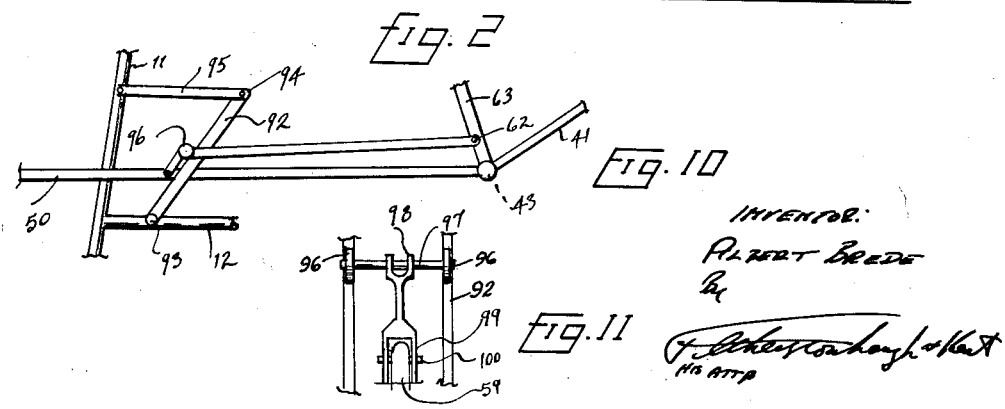
Fig. 10
Fig. 11
INVENTOR:
ALBERT BREDE
BY
HIS ATTY April 14, 1964  A. BREDE  3,128,801
SAW WITH RECIPROCATING ARBOR ASSEMBLY
Filed Dec. 11, 1961  2 Sheets-Sheet 2
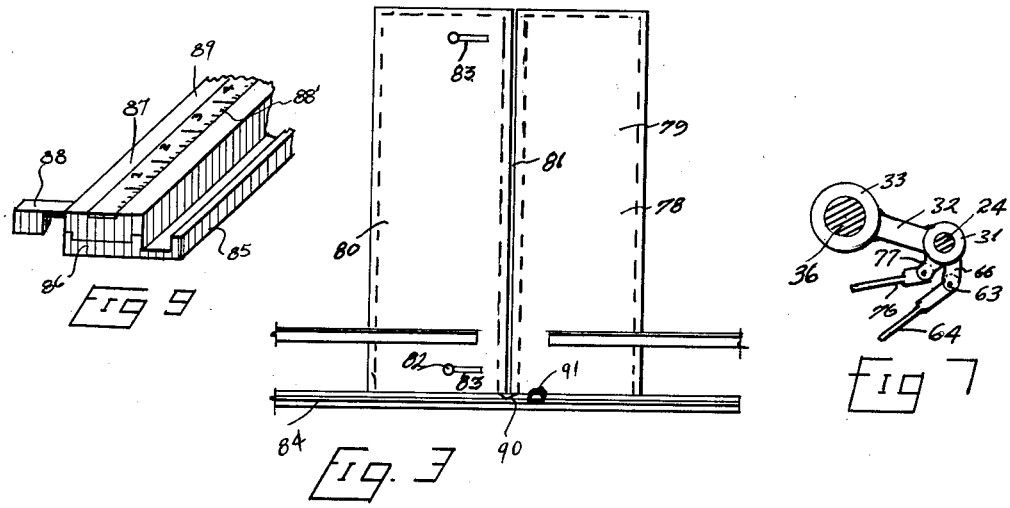
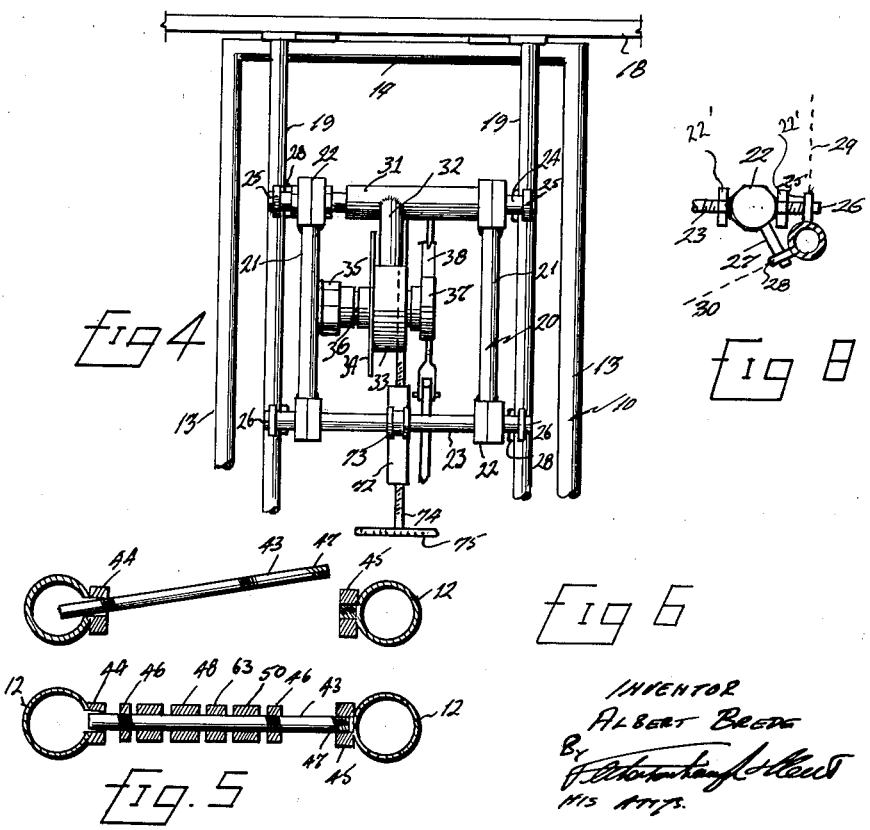
INVENTOR
ALBERT BREDE
HIS ATTYS.

United States Patent Office 3,128,801
Patented Apr. 14, 1964

3,128,801
SAW WITH RECIPROCATING ARBOR ASSEMBLY
Albert Brede, 582 College Ave., Winnipeg 4,
Manitoba, Canada
Filed Dec. 11, 1961, Ser. No. 158,292
1 Claim. (Cl. 143—47)

My invention relates to new and useful improvements in saws, particularly saws adapted for use for the cutting of wood, steel bars, stone and the like.

Conventional table type saws are of two types. Firstly the material to be cut is moved towards a stationary saw blade and secondly, the saw blade itself is mounted upon a pivot above the arbor so that the saw blade swings through the work normally pulled thereto either by means of a treadle or by manipulation of the operator.

Both of these suffer from several disadvantages particularly when used for the sawing of metal stock or stone.

I have overcome the principal disadvantage of these two types by providing a saw arbor adapted to be journalled for free rolling fore and aft upon a framework, the journalling of said arbor being by means of roller bearings embracing guideways and the arbor assembly being moved fore and aft by means of treadle and linkage connections.

The principal object and essence of my invention is therefore to provide a saw of the character herewithin described in which the saw arbor is mounted upon roller bearings so that although the arbor rolls accurately and easily along the guides, nevertheless it cannot be detracked from the guides due to the positioning of the roller bearings.

Another object of my invention is to provide a device of the character herewithin described in which the vertical position of the saw blade can be adjusted within limits with relation to the table top.

Yet another object of my invention is to provide a device of the character herewithin described in which the source of power is also pivoted upwardly when the arbor is moved forwardly so that the belt tension remains constant at all times and the weight of the source of power returns the arbor to the rear position as soon as the treadle is released.

Yet another object of my invention is to provide a device of the character herewithin described which is extremely simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a side elevation of my device with the saw arbor at the rear position.

FIGURE 2 is a view similar to FIGURE 1 but showing the saw arbor at the front position.

FIGURE 3 is a top plan view of the table top.

FIGURE 4 is a fragmentary top plan view of the saw arbor and guides.

FIGURE 5 is a sectional view showing the main pivot bar attachment.

FIGURE 6 is a view similar to FIGURE 5 but showing the assembly of this main pivot bar.

FIGURE 7 is an enlarged fragmentary cross sectional view of part of the saw arbor and its mounting.

FIGURE 8 is an enlarged fragmentary cross sectional view of one of the guideways showing one corner of the arbor assembly engaged therearound.

FIGURE 9 is a fragmentary enlarged perspective view of the adjustable fence.

FIGURE 10 (Sheet 1) is a fragmentary side elevation of an alternative means for moving the saw arbor.

FIGURE 11 is a fragmentary end elevation of the roller assembly of FIGURE 10.

In the drawings like characters of reference indicate corresponding parts in the different figures.

Proceeding therefore to describe my invention in detail, reference should be made to the accompanying drawings in which I have illustrated supporting framework collectively designated 10 consisting of four corner posts 11, longitudinal members 12 and 13, and transverse members 14, all of which form a substantially open box-like framework and may be constructed either of tubular steel or angle iron as desired.

Extending upwardly from the framework is a front support frame 15 and a rear support frame 16, each frame including uprights 17 and transverse members 18, only the uppermost ones being illustrated.

Secured to and extending between the uprights 17 of the fore and aft frames 15 and 16 is a pair of guides 19 in spaced and parallel relationship one with the other, said guides preferably being cylindrical in cross sectional configuration and being made either from tubular stock or solid stock as desired.

Journalled for fore and aft movement along these guides is a saw arbor assembly collectively designated 20, this saw arbor assembly including a pair of longitudinal members 21, the ends of which are secured as by welding within blocks 22 as clearly shown in FIGURE 4.

Extending between and through the front pair of blocks 22 is a cross bar 23 the extremities of which extend outwardly from the blocks 22 as clearly shown in FIGURES 4 and 8.

A similar cross bar 24 extends between and through the rear pair of blocks 22 and the extremities also extend outwardly in a similar manner to the extremities of the front bar 23.

Roller bearings 25 are journalled for rotation upon the extremities 26 of the bars 23 and 24 and are adapted to support the arbor assembly 20 upon the upper side of the guides 19 as clearly shown in FIGURE 8.

Stub axles 27 are secured to the blocks 22 and extend downwardly and outwardly therefrom to support for rotation upon the extremities thereof, further roller bearings 28 which also engage the tubular guides 19 but towards the inner underside thereof.

Reference characters 29 and 30 illustrate the planes in which the bearings 25 and 28 rotate respectively, both of these planes being parallel to the longitudinal axes of the guides 19 but being at an obtuse angle one with the other as clearly shown in FIGURE 8.

This means that the saw arbor can roll freely fore and aft along the guides 19 but is prevented from sideways movement and from upwards or displaceable movement with respect to the guides 19 thus making an accurately mounted saw arbor which cannot be detracked from the guides 19.

The portions of the cross bar 24 adjacent the blocks 22 are screw threaded and nuts 22' engage these screw threads one upon each side of each of the blocks 22. Therefore by adjusting these nuts, fine adjustment of the engagement of the rollers 28 with the tubes or rods 19, may be obtained.

A sleeve 31 is journalled for partial rotation upon the rear bar 24 between the blocks 22 and an arbor support 32 is secured to this sleeve and extends therefrom to carry the saw arbor 36 upon which is mounted the saw blade 34 by means of nut 35.

The spindle 36 carrying the blade 34 and being journalled for rotation within the bearing 33, extends upon the side of the bearing opposite to the blade 34 and carries a V-pulley 37 secured thereto. A drive belt 38 extends around this pulley and around a further pulley 39 (FIGS. 1 and 2) secured to a source of power in the form of an electric motor 40 mounted upon a motor support plate 41 and being connectable to a source of electrical energy by means of flexible conduits 42.

Spanning the two longitudinal members 12 of the framework 10 is a main bearing shaft 43 and details of this shaft are shown in FIGURES 5 and 6. One of the support bars 12 is apertured and a sleeve 44 is welded around this aperture. The other member 12 is also apertured and a nut 45 is welded around this aperture. The shaft 43 is adapted to slide through the sleeve 44 as shown in FIGURE 5 and to be tilted as illustrated in FIGURE 6, so that the various components pivotally supported thereby (details of which will be discussed later) may be placed thereon and retained in position by means of lock nuts 46 engaging the shaft 43. The end 47 of the shaft is then lowered into position so that the screw threaded portion thereof may engage the nut 45 and may be tightened therein thus securing the shaft firmly as clearly shown in FIGURE 5.

The aforementioned motor support plate 41 is provided with a lug 48 apertured and engageable around the aforementioned shaft 43 so that the motor plate is freely pivotal upon this shaft.

It will therefore be seen that when the arbor assembly is in the rearward position shown in FIGURE 1, the motor support plate and motor are substantially horizontal but the weight of the motor maintains the belt 38 at a constant tension.

However, when the arbor assembly is moved forwardly in the direction of arrow 49 to take up the position shown in FIGURE 2, the motor support plate pivots upwardly as clearly shown, the weight of the motor once again maintaining the tension of the belt 38. The weight of the motor also pulls the arbor assembly rearwardly when the operating means is released.

The aforementioned operating means consists of a foot treadle lever 50 pivotally secured by the rear end thereof to the aforementioned main shaft 43. Intermediate the ends of the foot treadle is a link 51 pivoted to the foot treadle by means of pin 52. The upper end 53 of this main link is pivotally connected to a horizontal arm 54 of a bell crank 55 pivotally secured by the apex 56 thereof to a bracket 57 situated adjacent the upper front side 58 of the framework.

A connecting link 59 extends between the lower end 60 of a vertically situated arm 61 of the bell crank 55, said link running rearwardly to be connected intermediate the ends at point 62 of a main lever 63.

This main lever 63 is pivotally connected by the lower end thereof to the aforementioned main shaft 43 and by the upper end thereof to an arbor link 64 by means of pin 65. The arbor link, in turn, is pivotally connected to a lug 66 secured to and extending downwardly from the aforementioned sleeve 31 surrounding the shaft 24 of the arbor assembly (see FIGURE 7).

From the foregoing, it will be appreciated that if the treadle assembly 50 is pushed downwardly in the direction of arrow 67, link 51 moves in the direction of arrow 68 (FIG. 1) thus rotating the bell crank 55 in the direction of arrow 69 which draws the connecting link 59 in the direction of arrow 70. This in turn draws the main lever 63 in the direction of arrow 71 and the arbor link together with the arbor in the direction of the aforementioned arrow 49. As hereinbefore described, release of pressure on the treadle 50 permits the weight of the motor 40 to return the arbor assembly to the rearward position.

Means are provided to extend or retract the saw blade 34 vertically, said means taking the form of a screw threaded sleeve 72 secured to lugs 73 (FIG. 4) held upon tubular member 23 of the saw arbor assembly. A screw threaded rod 74 operated by wheel 75, engages the sleeve 72 and extends rearwardly to be pivotally connected by the end 76 thereof to a further lug 77 secured to and extending below the aforementioned sleeve 31 surrounding the shaft 24 at the rear of the arbor assembly (see FIGURE 7). It will therefore be appreciated that rotation of the wheel 75 in one direction or the other, causes the arbor 33 to move in one direction or the other thus extending or retracting the saw blade 34.

FIGURE 3 shows a top plan view in which the table top 78 is formed in two halves 79 and 80. The portion 79 is preferably fixed in position with the saw blade coming through the slot 81 between said two halves. The portion 80 of the table top is preferably detachably secured by means of bolts 82 running in slots 83 formed in the table top so that this portion of the table can be moved leftwardly with respect to the portion 79 to facilitate the removal and replacement of the saw blade 34 upon the arbor 33.

Reference character 84 illustrates a fence assembly secured adjacent the front edge of the table. It consists of an elongated bar 85 (FIG. 9) having a longitudinally extending recess channel 86 formed in the upper surface thereof. Slidable along this channel is a fence bar 87 having a stop 88 secured to one end thereof. A measuring tape or the like 88' is recessed within the upper surface 89 of the fence bar 87 and a stationary pointer 90 is secured to the bar 85 in alignment with the saw slot 81 of the table. A conventional clamping screw 91 coacts between the bar 85 and the fence bar 87 so that the fence bar can be clamped in the desired position.

By moving the fence bar 87 within the channel 86 until the desired width is indicated by the measuring tape 88' against the pointer 90, the fence may be locked in position thus giving an accurate guide between the stop 88 and the saw blade passing through the saw slot 81.

FIGURES 10 and 11 show an alternative embodiment for operating the saw under assembly consisting of a foot treadle lever 50 situated within the framework as hereinbefore described.

In this embodiment however, a pair of upwardly inclined guides 92 extend from a transverse rod 93 which in turn spans the longitudinal members 12 of the frame. The upper ends 94 of these guides are anchored in position by means of horizontal members 95 extending forwardly to the front of the frame as shown in FIGURE 10. A pair of rollers 96 are journalled for rotation upon a cross pin 97 and are adapted to run up and down the guides 92 due to movement of the foot treadle 50. The pin 97 is held within a clevis 98 which in turn extends to a bifurcated fork 99 to which is pivotally connected one end of the aforementioned link 59 by means of pin 100.

The ramp action of the guides 92 facilitate the operation of link 59 which is anchored to the roller assembly rather than to the member 61.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

A saw comprising in combination a supporting framework, a pair of spaced and parallel guides supported by said framework and running from the front to the rear thereof adjacent the upper side thereof, a saw arbor assembly mounted on said guides for fore and aft movement therealong, a source of power operatively connected to said saw arbor, treadle means pivotally connected by one end thereof to said framework, and linkage means connected between said treadle means and said saw arbor assembly adapted to move said saw arbor along said guideways, said linkage means including a bell crank pivotally secured by the apex thereof to adjacent the upper front side of said framework with one arm depending substantially downwardly from said apex and the other arm extending substantially horizontally therefrom and towards the rear of said framework, a link extending from said treadle to said other arm, a main lever pivotally connected by the lower end thereof to said framework adjacent the point of pivotal connection thereto of said treadle, and by the other end thereof to said arbor assembly, and a connecting link pivotally connected by one end thereof to said one arm of said bell crank and by the other end thereof to intermediate the ends of said main lever.

References Cited in the file of this patent
UNITED STATES PATENTS

| | | |
|---|---|---|
| 134,698 | Otis | Jan. 7, 1873 |
| 733,063 | Marsh | July 7, 1903 |
| 2,602,477 | Kniff | July 8, 1952 |
| 2,870,802 | Richards | Jan. 27, 1959 |